under 35 U.S.C. 154(b) by 63 days.

(12) United States Patent
Bolton et al.

(10) Patent No.: US 8,006,685 B2
(45) Date of Patent: Aug. 30, 2011

(54) RE-CIRCULATING OVEN WITH GAS CLEAN-UP

(75) Inventors: David A. Bolton, Southlake, TX (US); David H. McFadden, Lexington, MA (US)

(73) Assignee: Turbochef Technologies, Inc., Atlanta, GA (US)

( * ) Notice: Subject to any disclaimer, the term of this patent is extended or adjusted under 35 U.S.C. 154(b) by 63 days.

(21) Appl. No.: 11/663,253

(22) PCT Filed: Oct. 5, 2005

(86) PCT No.: PCT/US2005/035605
§ 371 (c)(1),
(2), (4) Date: Mar. 19, 2007

(87) PCT Pub. No.: WO2006/041814
PCT Pub. Date: Apr. 20, 2006

(65) Prior Publication Data
US 2008/0099008 A1    May 1, 2008

Related U.S. Application Data

(63) Continuation-in-part of application No. 11/098,280, filed on Apr. 4, 2005, now Pat. No. 7,360,533, and a continuation-in-part of application No. 10/614,268, filed on Jul. 7, 2003, and a continuation-in-part of application No. 10/614,532, filed on Jul. 7, 2003, and a continuation-in-part of application No. 10/614,710, filed on Jul. 7, 2003, now Pat. No. 7,055,518.

(60) Provisional application No. 60/615,888, filed on Oct. 5, 2004, provisional application No. 60/661,591, filed on Mar. 14, 2005.

(51) Int. Cl.
*A47J 37/00* (2006.01)

(52) U.S. Cl. .................. 126/21 A; 126/21 R; 126/19 R; 126/299 D; 126/299 R; 99/324; 99/476; 99/443 C; 219/400; 219/681; 219/679

(58) Field of Classification Search ................ 126/21 R, 126/21 A, 19 R, 299 D, 299 R, 299 F, 273 R, 126/15 A, 15 R; 99/324, 476, 443 C, 475; 219/400, 681, 679, 696, 746, 751, 691, 398
See application file for complete search history.

(56) References Cited

U.S. PATENT DOCUMENTS 2,563,253 A    8/1951    Levin
2,704,802 A    3/1955    Blass et al.
(Continued)

FOREIGN PATENT DOCUMENTS
CN        2348616        11/1999
(Continued)

OTHER PUBLICATIONS

U.S. Appl. No. 11/928,037, filed Oct. 30, 2007, McFadden.
(Continued)

*Primary Examiner* — Steven B McAllister
*Assistant Examiner* — Avinash Savani
(74) *Attorney, Agent, or Firm* — Dean W. Russell; Kristin M. Crall; Kilpatrick Townsend & Stockton LLP

(57) ABSTRACT

A bleed gas clean-up system for a re-circulating oven.

21 Claims, 5 Drawing Sheets

U.S. PATENT DOCUMENTS

| | | | |
|---|---|---|---|
| 3,210,511 A | 10/1965 | Smith | |
| 3,548,152 A | 12/1970 | Klepzig | |
| 3,581,038 A | 5/1971 | Williams | |
| 3,813,216 A | 5/1974 | Baur et al. | |
| 3,828,760 A | 8/1974 | Farber et al. | |
| 3,973,551 A * | 8/1976 | Caselani et al. | 126/21 A |
| 3,991,737 A * | 11/1976 | Del Fabbro | 126/21 A |
| 4,001,451 A | 1/1977 | Veeneman et al. | |
| 4,154,861 A | 5/1979 | Smith | |
| 4,160,144 A | 7/1979 | Kashyap et al. | |
| 4,160,145 A | 7/1979 | Rueggeberg | |
| 4,283,614 A | 8/1981 | Tanaka et al. | |
| 4,316,069 A | 2/1982 | Fitzmayer | |
| 4,327,274 A | 4/1982 | White et al. | |
| 4,327,279 A | 4/1982 | Guibert | |
| 4,337,384 A | 6/1982 | Tanaka et al. | |
| 4,338,911 A | 7/1982 | Smith | |
| 4,350,504 A | 9/1982 | Diachuk | |
| 4,354,083 A | 10/1982 | Staats | |
| 4,403,128 A | 9/1983 | Takagi et al. | |
| 4,409,453 A | 10/1983 | Smith | |
| 4,431,889 A | 2/1984 | Saponara et al. | |
| 4,455,924 A | 6/1984 | Wenzel | |
| 4,464,554 A | 8/1984 | Bakanowski et al. | |
| 4,480,164 A | 10/1984 | Dills | |
| 4,481,396 A | 11/1984 | Matsubayashi et al. | |
| 4,494,525 A * | 1/1985 | Albertsen | 126/289 |
| 4,516,012 A * | 5/1985 | Smith et al. | 219/400 |
| 4,737,373 A | 4/1988 | Forney | |
| 4,743,728 A | 5/1988 | Nagafusa et al. | |
| 4,752,268 A | 6/1988 | Kataoka et al. | |
| 4,786,774 A * | 11/1988 | Kaminaka | 219/757 |
| 4,849,597 A * | 7/1989 | Waigand | 219/414 |
| 4,924,763 A | 5/1990 | Bingham | |
| 4,949,629 A | 8/1990 | Leary et al. | |
| 4,958,412 A | 9/1990 | Stanek | |
| 4,965,435 A | 10/1990 | Smith et al. | |
| 5,025,775 A | 6/1991 | Crisp | |
| 5,147,994 A | 9/1992 | Smith et al. | |
| 5,155,318 A | 10/1992 | Bowen | |
| 5,161,889 A | 11/1992 | Smith et al. | |
| 5,166,487 A | 11/1992 | Hurley et al. | |
| 5,204,503 A | 4/1993 | Maiellano et al. | |
| 5,277,105 A | 1/1994 | Bruno | |
| 5,369,250 A | 11/1994 | Meredith | |
| 5,401,940 A * | 3/1995 | Smith et al. | 219/679 |
| 5,555,795 A | 9/1996 | Tsai | |
| 5,676,870 A | 10/1997 | Wassman et al. | |
| 5,717,192 A * | 2/1998 | Dobie et al. | 219/681 |
| 5,825,000 A | 10/1998 | Jun | |
| 5,826,496 A | 10/1998 | Jara | |
| 5,927,265 A | 7/1999 | McKee et al. | |
| 5,934,178 A | 8/1999 | Caridis et al. | |
| 5,994,672 A | 11/1999 | Mestnik | |
| 6,012,442 A | 1/2000 | Faraj | |
| 6,058,924 A | 5/2000 | Pool et al. | |
| 6,060,701 A | 5/2000 | McKee et al. | |
| 6,114,664 A | 9/2000 | Cook et al. | |
| 6,250,296 B1 | 6/2001 | Norris et al. | |
| 6,291,808 B1 | 9/2001 | Brown | |
| 6,369,360 B1 | 4/2002 | Cook | |
| 6,376,817 B1 | 4/2002 | McFadden | |
| 6,399,930 B2 | 6/2002 | Day et al. | |
| 6,403,937 B1 | 6/2002 | Day et al. | |
| 6,437,303 B1 | 8/2002 | Dorr et al. | |
| 6,472,640 B2 * | 10/2002 | Brown et al. | 219/400 |
| 6,472,647 B2 | 10/2002 | Lee et al. | |
| 6,481,999 B2 | 11/2002 | Knost | |
| 6,655,373 B1 | 12/2003 | Wiker | |
| 6,712,063 B1 * | 3/2004 | Thorneywork | 126/21 A |
| 6,713,741 B2 | 3/2004 | Miller | |
| 6,854,456 B1 | 2/2005 | Friedrich et al. | |
| 6,874,495 B2 | 4/2005 | McFadden | |
| 6,909,078 B2 | 6/2005 | Lee et al. | |
| 7,055,518 B2 | 6/2006 | McFadden | |
| 7,087,872 B1 | 8/2006 | Dobie et al. | |
| 7,360,533 B2 | 4/2008 | McFadden | |
| 7,424,848 B2 | 9/2008 | Jones et al. | |
| 7,468,495 B2 | 12/2008 | Carbone et al. | |
| 7,507,938 B2 | 3/2009 | McFadden | |
| 7,836,874 B2 | 11/2010 | McFadden | |
| 7,836,875 B2 | 11/2010 | McFadden et al. | |
| 2001/0054605 A1 | 12/2001 | Suzuki et al. | |
| 2002/0023911 A1 | 2/2002 | Bales et al. | |
| 2002/0179588 A1 | 12/2002 | Lubrina et al. | |
| 2003/0226452 A1 | 12/2003 | Artt | |
| 2004/0118392 A1 | 6/2004 | McFadden | |
| 2004/0123858 A1 | 7/2004 | McFadden | |
| 2004/0200828 A1 | 10/2004 | Becker et al. | |
| 2004/0211765 A1 | 10/2004 | McFadden | |
| 2004/0216732 A1 | 11/2004 | McFadden | |
| 2005/0039613 A1 * | 2/2005 | Kaminaka et al. | 99/476 |
| 2005/0211775 A1 | 9/2005 | Vaseloff et al. | |
| 2005/0217503 A1 | 10/2005 | McFadden | |
| 2006/0169272 A1 | 8/2006 | McFadden et al. | |
| 2007/0137633 A1 | 6/2007 | McFadden | |
| 2007/0139633 A1 | 6/2007 | Bleeker et al. | |
| 2007/0194011 A1 | 8/2007 | McFadden | |
| 2007/0295322 A1 | 12/2007 | Dobie et al. | |
| 2008/0105133 A1 | 5/2008 | McFadden et al. | |
| 2008/0105135 A1 | 5/2008 | McFadden et al. | |
| 2008/0105136 A1 | 5/2008 | McFadden | |
| 2008/0105249 A1 | 5/2008 | McFadden et al. | |
| 2008/0106483 A1 | 5/2008 | McFadden et al. | |
| 2008/0206420 A1 | 8/2008 | McFadden | |
| 2008/0216812 A1 | 9/2008 | Dougherty | |
| 2008/0296284 A1 | 12/2008 | McFadden | |

FOREIGN PATENT DOCUMENTS

| | | |
|---|---|---|
| DE | 25 57 867 A | 6/1977 |
| DE | 3119596 A1 | 12/1982 |
| DE | 8801849 U1 | 3/1988 |
| DE | 3734958 A1 | 4/1989 |
| EP | 0 096 159 | 12/1983 |
| EP | 0429822 | 6/1991 |
| EP | 0429822 A1 | 6/1991 |
| EP | 0429822AJ | 6/1991 |
| EP | 0534787 A1 | 3/1993 |
| GB | 2043237 | 10/1980 |
| JP | 62218736 A | 9/1987 |
| JP | 63-317068 A | 12/1988 |
| JP | 2000254001 | 9/2000 |
| WO | WO 9836619 | 8/1998 |
| WO | WO2004/014139 | 2/2004 |
| WO | WO-2004014139 | 2/2004 |
| WO | WO 2005/041672 | 5/2005 |
| WO | WO 2005/087009 A1 | 9/2005 |
| WO | WO-2006041814 | 4/2006 |
| WO | WO 2006/081202 | 8/2006 |
| WO | WO 2006/099394 | 9/2006 |
| WO | WO2009058934 | 5/2009 |

OTHER PUBLICATIONS

Office Action dated Oct. 3, 2008 in related U.S. Appl. No. 10/591,074.

Office Action dated Aug. 19, 2008 in related U.S. Appl. No. 11/663,253.

Office Action dated May 30, 2007 in related U.S. Appl. No. 10/614,268.

Response dated Nov. 30, 2007 in related U.S. Appl. No. 10/614,268.

Office Action dated Feb. 4, 2008 in related U.S. Appl. No. 10/614,268.

Response dated Aug. 4, 2008 in related U.S. Appl. No. 10/614,268.

Office Action dated Aug. 13, 2007 in related U.S. Appl. No. 10/576,847.

Response dated Feb. 12, 2008 in related U.S. Appl. No. 10/576,847.

Office Action dated Apr. 24, 2008 in related U.S. Appl. No. 10/576,847.

Response dated Oct. 7, 2008 in related U.S. Appl. No. 10/576,847.

Office Action dated Sep. 4, 2007 in related U.S. Appl. No. 11/392,050.

Response dated Mar. 6, 2008 in related U.S. Appl. No. 11/392,050.

Office Action dated Jul. 22, 2008 in related U.S. Appl. No. 11/392,050.

Office Action dated Jan. 25, 2005 in related U.S. Appl. No. 10/614,532.
Response dated Jun. 27, 2005 in related U.S. Appl. No. 10/614,532.
Office Action dated Sep. 22, 2005 in related U.S. Appl. No. 10/614,532.
Response dated Mar. 22, 2006 in related U.S. Appl. No. 10/614,532.
Office Action dated Apr. 7, 2006 in related U.S. Appl. No. 10/614,532.
Response dated Oct. 10, 2006 in related U.S. Appl. No. 10/614,532.
Office Action dated Jan. 11, 2007 in related U.S. Appl. No. 10/614,532.
Response dated Jul. 11, 2007 in related U.S. Appl. No. 10/614,532.
Office Action dated Sep. 27, 2007 in related U.S. Appl. No. 10/614,532.
Response dated Mar. 27, 2008 in related U.S. Appl. No. 10/614,532.
Office Action dated Jul. 23, 2008 in related U.S. Appl. No. 10/614,532.
International Search Report and Written Opinion dated Feb. 11, 2009 in related Application No. PCT/US2008/081689.
Rueggeberg, 'A Multislotted Waveguide Antenna for High-Powered Microwave Heating Systems,' IEEE Transactions on Industry Applications, IA-16(6):809-813 (1980).
Supplementary Search Report dated Mar. 4, 2009 in related European Application No. 04816933.
Response dated Dec. 17, 2008 in related U.S. Appl. No. 10/591,074.
Response dated Jan. 16, 2009 in related U.S. Appl. No. 11/392,050.
Response dated Jan. 16, 2009 in related U.S. Appl. No. 10/614,532.
Response dated Jan. 23, 2009 in related U.S. Appl. No. 10/614,268.
Office Action dated Apr. 14, 2009 in related U.S. Appl. No. 10/614,532.
Response dated Jul. 7, 2009 in related U.S. Appl. No. 10/614,532.
Office Action dated Apr. 28, 2009 in related U.S. Appl. No. 10/614,268.
Response dated Jul. 7, 2009 in related U.S. Appl. No. 10/614,268.
Office Action dated Apr. 15, 2009 in related U.S. Appl. No. 11/392,050.
Response dated Jul. 7, 2009 in related U.S. Appl. No. 11/392,050.
Office Action dated Apr. 15, 2009 in related U.S. Appl. No. 10/591,074.
Abstract JP2000254001 published Mar. 8, 1999.
Office Action dated Feb. 5, 2009 in related U.S. Appl. No. 11/928,063.
Response dated Aug. 4, 2009 in related U.S. Appl. No. 11/928,063.
Office Action dated Jul. 15, 2009 in related U.S. Appl. No. 11/908,169.
Office Action dated Jul. 23, 2009 in related U.S. Appl. No. 11/928,007.
U.S. Appl. No. 10/614,532 Response dated Jul. 20, 2010.
U.S. Appl. No. 11/928,037 Non-Final Office Action dated Aug. 31, 2010.
U.S. Appl. No. 11/908,169 Response dated Sep. 14, 2010.
U.S. Appl. No. 10/614,532 Final Office Action dated Oct. 13, 2010.
U.S. Appl. No. 11/908,169 Final Office Action dated Nov. 29, 2010.
Response dated Dec. 11, 2009 in U.S. Appl. No. 11/908,169.
Office Action dated May 14, 2010 in U.S. Appl. No. 11/906,169.
Response dated Oct. 14, 2009 in U.S. Appl. No. 10/591,074.
Office Action dated Dec. 28, 2009 in U.S. Appl. No. 10/591,074.
Office Action dated Nov. 12, 2009 in U.S. Appl. No. 10/614,532.
Response dated Feb. 11, 2010 in U.S. Appl. No. 10/614,532.
Office Action dated Mar. 26, 2010 in U.S. Appl. No. 10/614,532.
Response dated Jul. 7, 2009 in U.S. Appl. No. 10/614,268.
Notice of Allowance dated Dec. 7, 2009 in U.S. Appl. No. 10/614,268.
Response dated Jan. 5, 2010 in U.S. Appl. No. 10/614,268.
Notice of Allowance dated May 24, 2010 in U.S. Appl. No. 10/614,268.
Office Action dated Sep. 14, 2009 in U.S. Appl. No. 11/392,050.
Response dated Dec. 14, 2009 in U.S. Appl. No. 11/392,050.
Notice of Allowance dated Apr. 15, 2010 in U.S. Appl. No. 11/392,050.
U.S. Appl. No. 10/614,532 Response dated Jan. 13, 2011.
U.S. Appl. No. 10/614,532 Office Action dated Feb. 2, 2011.
EP03759175 Supplemental European Search Report dated Jun. 10, 2010.
U.S. Appl. No. 10/614,268 Response dated Jan. 5, 2010.
U.S. Appl. No. 10/614,532 Response dated Feb. 11, 2010.
U.S. Appl. No. 11/928,037 Response dated Dec. 30, 2010.
Notice of Allowance dated Mar. 28, 2011 in U.S. Appl. No. 11/928,037.
Office Action dated Jun. 8, 2011 in U.S. Appl. No. 11/908,169.
EP03759175 Supplemental European Search Report mailed Jun. 10, 2010.
EP03759175 Office Action dated Nov. 4, 2010.
PCT/US2008/056358 Partial International Search Report dated Jul. 15, 2008.
U.S. Appl. No. 10/614,532 Office Acton dated Feb. 2, 2011.
U.S. Appl. No. 11/663,253 Response dated Nov. 18, 2008.
U.S. Appl. No. 11/663,253 Supplemental Response dated Dec. 11, 2008.
U.S. Appl. No. 11/663,253 Request for Continued Examination filed Jul. 15, 2010.

* cited by examiner

RE-CIRCULATING OVEN WITH GAS CLEAN-UP

CROSS REFERENCE TO RELATED APPLICATIONS

This application is the U.S. national phase of International Application No. PCT/US2005/035605 filed on Oct. 5, 2005 published in English on Apr. 20, 2006 as International Publication No. WO 2006/041814 A1, which application claims priority to U.S. Provisional Application No. 60/615,888 filed on Oct. 5, 2004; International Application No. PCT/US2005/007261 filed on Mar. 7, 2005; U.S. Provisional Application No. 60/661,591 filed on Mar. 14, 2005; and U.S. patent application Ser. No. 11/098,280 filed on Apr. 4, 2005, the contents of which are incorporated by reference herein.

Upon entry into the National Stage in the United States of America, the present application will be a continuation-in-part of U.S. application Ser. No. 11/098,280 filed 4 Apr. 2005 now U.S. Pat. No. 7,360,533; will be a continuation-in-part of U.S. application Ser. No. 10/614,268 filed 7 Jul. 2003; will be a continuation-in-part of U.S. application Ser. No. 10/614,532 filed 7 Jul. 2003; and will be a continuation-in-part of U.S. application Ser. No. 10/614,710 filed 7 Jul. 2003 now U.S. Pat. No. 7,055,518.

The present application contains technical disclosure in common with International Application No. PCT/US2003/021225 filed 5 Jul. 2003; contains technical disclosure in common with U.S. Provisional Application No. 60/394,216 filed 5 Jul. 2002; contains technical disclosure in common with PCT/US2004/035252 filed 21 Oct. 2004; contains technical disclosure in common with U.S. Provisional Application No. 60/513,110 filed 21 Oct. 2003; contains technical disclosure in common with U.S. Provisional Application No. 60/513,111 filed 23 Oct. 2003; contains technical disclosure in common with U.S. Provisional Application No. 60/614,877 filed 30 Sep. 2004; contains technical disclosure in common with U.S. Provisional Application No. 60/551,268 filed 8 Mar. 2004; and contains technical disclosure in common with U.S. Provisional Application No. 60/550,578 filed 5 Mar. 2004.

All of the applications set forth above are incorporated herein by reference as if fully set forth.

TECHNICAL FIELD

The present invention relates to ovens. In particular the present invention relates to bleed gas clean up systems for ovens.

DESCRIPTION OF THE PRIOR ART

Re-circulating ovens are known in the art and have been used for various types of cooking at various cooking speeds. A re-circulating oven utilizes a closed loop such that heated air that has been introduced into an oven cooking chamber for cooking a food product is exhausted from the oven cooking chamber (generally into a conduit means) heated, in some instances cleaned or scrubbed and then re-introduced via a conduit means, for example, into the oven chamber for additional or continued cooking of a food product. Most re-circulating ovens additionally contain a vent tube in order to vent to atmosphere a small portion of the re-circulated air. Re-circulating ovens generally contain a door through which food product is introduced into and removed from the cooking chamber. Air flow therefore escapes the oven chamber when these doors are opened. For all of the above reasons, re-circulating ovens generally do not re-circulate all of the air but lose some air to vents, leakage throughout the oven chamber due to separations in metal at oven seams and loss through oven chamber access doors. Therefore, as used herein the term "re-circulating" and "substantially re-circulating" have the same meaning and refer to that airflow that is re-circulated through a re-circulating oven during a cooking cycle.

As used herein, the term "commercial" includes, but is not limited to the commercial food service industry, restaurants, fast food establishments, speed service restaurants, convenience stores (to list a few) and other mass feeding establishments; the term "residential" refers, generally speaking, to residential applications (home use), although the term is not limited to residences only, but refers to non-commercial uses of our invention and is not limited to commercial or residential uses only, and is equally applicable for vending, industrial and other uses wherein cooking by products are produced as a result of the cooking process. The terms "oven chamber," "cook chamber," "cooking chamber," and "oven cavity" have the same meaning and the term "gas" refers to any fluid mixture, including air, nitrogen, steam and other mixtures that may be used for cooking and applicant intends to encompass within the language any gas or gas mixture existing or developed in the future that performs the same function. The terms "conventional cooking" and "conventional means", have the same meaning and refer to cooking at the quality level and at the speed that is currently widely utilized. By way of example, the "conventional cooking time" for a residential food product is that time that is listed upon the retail food product label. The term "cooking by-products" refers to smoke, grease, vapors, small aerodynamic grease particles, odors, and other products caused by the cooking process and the term "odor filter" does not refer exclusively to filtering of odors, but instead refers generally to filtering, reduction of, removal of or catalytic destruction of by-products of the cooking process. As used herein, the term "rapid cooking" and "speed cooking" have the same meaning and refer to cooking at five to ten times faster, and in some instances more than 10 times faster than conventional cooking. The term "accelerated cooking" has the meaning of cooking at speeds faster than conventional cooking but not as fast as speed cooking.

As used herein, the term "re-circulating oven" encompasses any type of commercial, residential, vending or industrial oven, and also applies to uses of our invention for conventional, accelerated and speed cooking, and additionally applies to any combination of commercial, residential, vending, industrial, conventional, accelerated and speed cooking. By way of example, and not limitation, the invention may be practiced in a conventional commercial oven, accelerated commercial oven or speed cooking oven, a conventional residential oven, a residential accelerated cooking oven or a residential speed cooking oven. Further combinations are possible and applicant does not intend to be limited by the previous combination of examples.

In conventional, accelerated and speed cooking ovens, cooking by-products are produced during the cooking process. A speed cooking oven produces more cooking by-products in a shorter amount of time than a conventional oven and the increase in cooking by-products is roughly proportional to the increase in cooking speed. Therefore, control of cooking by-products is very important, especially for a speed cooking oven. Controlling cooking by-products, such as grease, is challenging because in a speed cooking oven, for example, high velocity gas flow tends to entrain a great deal of grease, both particles and vapor, into the gas flow stream and untreated grease creates a number of issues including rapid soiling of the oven cavity surfaces and gas ducts, thereby requiring frequent cleaning; smoke, odor transfer between food products cooked either together in the cook chamber, or successively. Important for commercial operation is the ability for an oven to operate vent free as per indoor air quality standards (e.g., UL197 SB for commercial applications), and acceptable control of cooking by-product levels is important for residential use, and for vending, conveyor and other commercial uses.

Historically, cooking by-product control was generally accomplished through the use of a main convection airflow catalyst and in some instances the use of an additional vent filter. These filters have generally been of the catalytic type. In those instances wherein a vent catalyst is utilized, it is generally made of a catalyst material and placed within the oven vent duct, such duct providing a low airflow path between the oven cavity and the ambient environment. Typically a small "button" catalytic element consisting of either a screen material or a ceramic honeycomb matrix coated with a catalyst material is placed in the vent tube. The oven vent provides for the planned escape of hot air from the oven as the air expands during heating. This eliminates the inadvertent venting of hot oven air from around the door seal which can create a burn hazard or temperature issues for controls located near the door. During cooking a portion of the moisture evolved from the food product must be vented in order to provide acceptable food surface conditions.

A main airflow catalyst that is placed in the main air flow cleans air that re-circulates continuously over the food product. Such a clean-up system uses a metal or ceramic substrate to support the catalytic material and the typical placement is just downstream of the oven cavity in the return air duct, or conduit as previously described. As used herein the terms "conduit" and "air duct" have the same meaning. The grease laden air flow then passes through the main converter where the grease laden air comes in contact with the catalyst resulting is some oxidation of the grease. In such a system, all of the convection air passes through the main converter, thereby producing a significant pressure drop across the catalyst in the blower assisted convection loop. To accommodate the main catalyst, the destruction efficiency of the catalyst is greatly reduced in order to reduce the pressure drop across the catalyst to acceptable levels. Generally, for this configuration, the oven must be operate at temperatures in the 450° F. (232.22° C.) range in order to reach destruction efficiencies greater than 10%; and for such low destruction efficiencies, the grease laden air must make many passes through the main catalyst in order to produce acceptable or desired grease control. At 350° F. (176.67° C.) oven temperatures the catalyst provides little grease removal benefit.

Therefore, employing the use of a gas clean-up system such as a catalytic converter where all the convection air passes through a main catalyst penalizes the airflow system relative to additional pressure drop, thereby increased energy use and increased component sizes (e.g., blower motor power, blower wheel diameter for a given rotational speed). In addition, the previously described vent catalyst may also be needed to eliminate objectionable odors and smoke during the cook event.

SUMMARY OF THE INVENTION

In order to overcome disadvantages of a main catalyst system, a bleed gas clean-up system may be utilized with a re-circulating oven with at least one cooking chamber and employing gas flow to cook, or re-thermalize a food product. The re-circulating oven may also utilize microwave energy, or other means such as radio frequency, induction and other thermal means, to further heat the food product. Microwave producing magnetrons may be used with side wall mounted microwave waveguides employing the use of slotted antenna, although it is not necessary that the microwave system launches from the oven cavity side walls and indeed launching microwaves from other oven cavity surfaces may be employed. The re-circulating oven may operate at conventional speed, accelerated speed or as a speed cooking oven.

Accordingly, it is an object of the present invention to provide a cooking by-product control system for re-circulating ovens that eliminates the need for separate vent gas and main convection gas catalytic converters.

A further object is the elimination of a main catalyst, and the associated pressure drop across the main catalyst.

A further object is effective cooking by-product control at lower operating temperatures which allows for a more flexible cooking product (equipment) and reduces long term "stress" on the oven components resulting from higher operating temperatures.

Additional objects, features and advantages of the present invention will become readily apparent from the following detailed description of the exemplary embodiment thereof, when taken in conjunction with the drawings wherein like reference numerals refer to corresponding parts in the several views.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DESCRIPTION OF THE PREFERRED EMBODIMENT

The exemplary embodiment is shown in conjunction with and utilized with a single cavity re-circulating speed cooking commercial oven, but the invention may be practiced with many other re-circulating oven embodiments and is not limited to the exemplary embodiment. The invention may also be scaled, either scaled up or scaled down. The term "scalable" and "scaled" herein means that additional larger or smaller versions may be developed, and each embodiment or version may have different size characteristics and utilize different cooking by-product destruction materials, cause various percentages of cooking by-product destruction and operate at various temperatures. Re-circulating gas flow within an oven has been described in commonly owned PCT Application Serial Number PCT/US2005/007261; U.S. Ser. No. 10/614, 268, U.S. Ser. No. 10/614,479, U.S. Ser. No. 10/614,532, U.S. Ser. No. 10/614,710, U.S. Ser. No. 11/098,280 and U.S. Pat.

No. 6,874,495 B2. Re-circulating gas flow may also be utilized with an air fryer such as is described in commonly owned U.S. Provisional Application Ser. No. 60/661,591.

During normal cooking it may be desirable for one food product to be cooked after another different type of food product with successive cycles continuing. For example a food product such as shrimp may be cooked first, followed by a baked product or pastry. Without appropriate filtration, oxidation and gas clean-up, the cooking by-products will contaminate the baked product, producing an undesirable taste and odor in the pastry. Although grease extractors may be utilized, further gas filtration may be desirable, or required. A bleed gas clean-up system may include various materials, including catalyst materials such as a corrugated foil coated with catalyst, or catalyst coated screens to further clean and scrub the gasflow. The catalyst acts to combust (oxidize) the cooking by-products. Such catalyst materials may also include, but is not limited to: activated charcoal, zeolite or other cooking by-product destruction approaches such as ultra violet wavelight light. It is beneficial that the odor filters be comprised of a material, or materials, that effectively scrubs, or cleans the gasflow with a minimal amount of interference with the gasflow velocities and it is beneficial that the odor filters be easily removable, easily cleaned and inexpensive to replace.

Figure 3:
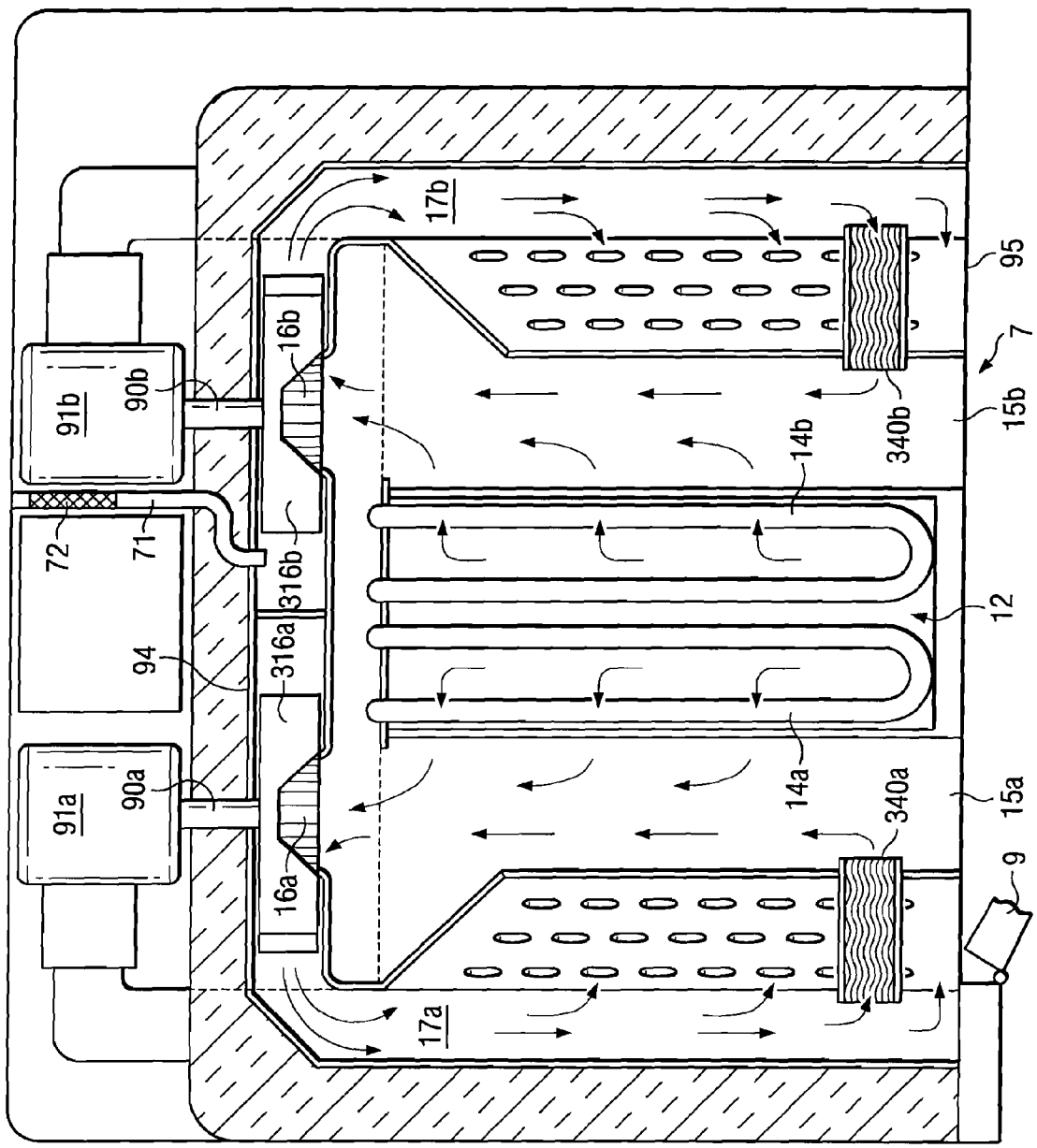
FIG. 3 is a top view of a single cavity speed cooking re-circulating oven.
Figure 4:
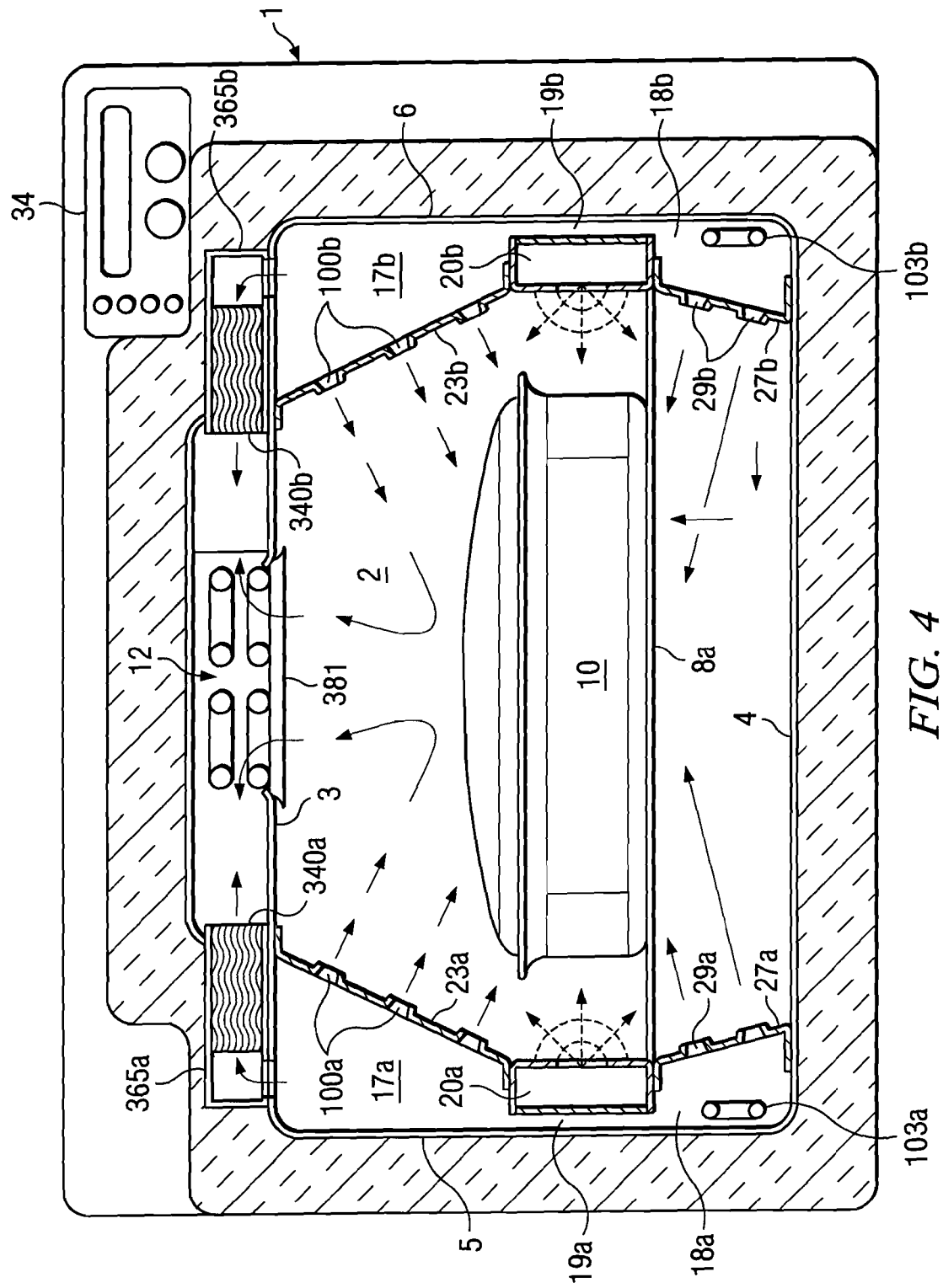
FIG. 4 is a front view of a single cavity speed cooking re-circulating oven.

Appliance 1 includes an oven cavity 2, FIG. 4 generally defined by, FIG. 4, a top wall 3, a bottom wall 4, left side wall 5 a right side wall 6, and FIG. 3, a back wall 94 and a front wall 95. Oven cavity 2 also has associated therewith an access opening 7, FIG. 3, through which food items 10 may be placed within oven cavity 2 upon cooking rack 8a, FIG. 4. Although the exemplary embodiment is shown as a countertop oven with one rack 8a, supported by plates 27a, 27b, the oven may be made with multiple racks and multiple gas delivery systems, and is not limited to a single rack design. Cooking rack 8a may also be a free-standing cooking rack not supported by said plates or may be otherwise supported from above Cooking appliance 1 has a hinged door 9, FIG. 3, pivotally attached to the oven front for closing the cooking section opening 7 during cooking operation. Hinged door 9 may be swung between an open position wherein the door allows access to oven cavity 2 and a closed position wherein the door covers the opening into oven cavity 2. Although illustrated as a hinged door pivotally attached at the left side of the front of the oven, the door may be hinged on the right side, bottom side or top side.

The speed cooking re-circulating oven is comprised of two independent gas transfer systems, described herein as a left gas transfer system and a right gas transfer system, wherein left gas transfer system delivers gas to and from the left side of the oven cavity 2, and right gas transfer system delivers gas to and from the right side of the oven cavity 2. Oven cavity 2 may also have associated therewith vent tube 71, FIG. 3, which allows for the passage of vent gas from oven cavity 2 to atmosphere. Vent tube 71 is not required for our invention but rather may be an additional feature allowing for venting of cooking by products in instances where this may be desirable. Affixed within vent tube 71 is odor filter 72 which provides for the removal of odors caused by the cooking process. Odor filter 72 may be made to be removable for cleaning or replacement. Various materials may be utilized to accomplish odor removal and varying efficiencies of said materials may also be employed. For example, in some instances it may be desirable for the odor filter to completely (as much as is possible) filter all odors while at other times it may be desirable to provide for a less efficient odor filter 72 in order to allow for the passage of some cooking odors. It has been found that during the cooking process, for example baking bread, the operator has an expectation of smelling bread cooking and it may not be desirable to completely filter all odors.

Referring to FIGS. 3, 4, gas is transferred to and from oven cavity 2 via a left gas transfer system, which is comprised of a left gas transfer section 15a, which extends from the front to back of oven top wall 3, along the left side of top wall 3. In fluid connection with left gas transfer section 15a is top gas egress opening 12, which is open to, and in fluid connection with oven cavity 2 through top wall 3. Top gas egress opening 12 is substantially rectangular, although other geometries may be employed, and is centrally located within oven top wall 3 and provides for the passage of gas from oven cavity 2 into left gas transfer section 15a, as gases are removed from oven cavity 2 through top egress gas egress opening 12. As gas is drawn through top gas egress opening 12, the gas may pass through a mechanical grease separator, 381, FIGS. 1,4, and thereafter pass across left heating means 14a. Heating means 14a may include direct fired thermal energy, indirect fired thermal energy, propane, natural gas, electric resistance heating elements, and other thermal means; and applicant intends to encompass within the language any structure presently existing or developed in the future that performs the same function. In fluid connection with, and located within left gas transfer section 15a is a left gas accelerator, illustrated as left blower wheel 16a. Other devices may be utilized to accelerate the gas flow, such as a compressor, and applicant intends to encompass within the language any structure presently existing or developed in the future that performs the same function as 16a, 90a, 91a and 16b, 90b and 91b, to be discussed further herein. Connected to left blower wheel 16a is blower motor shaft 90a, which is direct drive with electric motor 91a. Other means may be employed for coupling blower wheel 16a to electric motor 91a, such as belt drive and the means is not limited to direct drive. Blower wheel 16a takes gas from oven cavity 2 and delivers the gas via gas transfer section 17a to the left top side of oven cavity 2. Top left gas transfer section 17a, FIG. 2, is in fluid connection with a lower left gas transfer section 18a via a left vertical gas transfer section 19a. Left vertical gas transfer section 19a is bounded by left side wall 5 and a left microwave waveguide section 20a. As can be seen in FIG. 2, as gas is pumped into top left gas transfer section 17a, the gas is discharged through a top left discharge plate 23a into oven cavity 2 via apertures 100a and onto the left top and side portion of food product 10. Apertures 100a may be slotted, regularly formed or irregularly formed apertures and are illustrated herein as nozzles 100a and 29a and applicant intends to encompass within the language any structure presently existing or developed in the future that performs the same function as 100a, 29a and 100b and 29b, discussed further herein. Gas that has not been discharged through top left gas discharge plate 23a flows to lower left gas transfer section 18a via vertical transfer section 19a. Gas that is distributed to lower left gas transfer section 18a may be re-heated, if desired, by a lower left heating means 103a, shown in FIG. 4, before said gas passes through slotted or perforated lower left gas discharge plate 27a via apertures 29a, for discharge onto the left bottom and left side portions of food product 10 in oven cavity 2. Lower left heating means 103a may be present in some embodiments and not present in others depending upon the particular requirements for the speed cook oven. Apertures 100a and 29a are sized for a low pressure drop, while providing and maintaining sufficient gas velocities in the range of approximately 2000 ft/minute (609.6 m/minute) to approximately 6000 ft/minute (1828.8 m/minute) to properly cook the food product as described herein. In some instances, velocities below 2000 ft/minute (609.6 m/minute) and above 6000 ft/minute (1828.8 m/minute) may also be utilized. As shown in FIG. 2, apertures 100a are sized such that the majority of the gas is supplied from the top left gas discharge plate 23a. The resulting imbalance of gas flows between the top left gas discharge plate 23a and lower left gas discharge plate 27a is desirable because the top flows must aggressively remove moisture produced and escaping from the top and top side surface of the food product 10. The imbalance also serves to heat, brown and/or heat and brown the food product 10.

Referring again FIG. 3, gas is also transferred to and from oven cavity 2 via a right gas transfer system, which is comprised of a right gas transfer section 15b, which extends from the front to back of oven top wall 3, along the right side of top wall 3. In fluid connection with right gas transfer section 15b is top gas egress opening 12, previously described, which provides for the passage of gas from oven cavity 2 into right gas transfer section 15b, as gases are removed from oven cavity 2 through top egress gas egress opening 12 As gas is drawn through top gas egress opening 12, the gas passes across heating means 14b. As with the left side, in fluid connection with, and located within right gas transfer section 15b is a right gas accelerator, illustrated as right blower wheel 16b. Connected to right blower wheel 16b is blower motor shaft 90b, which is direct drive with electric motor 91b. Other means may be employed for coupling blower wheel 16b to electric motor 91b, such as belt drive and the means is not limited to direct drive. Blower wheel 16b takes gas from oven cavity 2 and delivers the gas via gas transfer section 17b to the right top side of oven cavity 2. Although illustrated as a conventional blower motor, as with the left side, blower motor shaft and blower wheel, other gas pumping means such as a compressor may be utilized to re-circulate gas to and from oven cavity 2 and the invention is not limited to use of a blower motor and blower wheel combination. Top right gas transfer section 17b is in fluid connection with a lower right gas transfer section 18b via a right vertical gas transfer section 19b. Right vertical transfer section 19b is bounded by right side wall 6 and a right microwave waveguide section 20b. As can be seen in FIG. 4, as gas is pumped into top right gas transfer section 17b, the gas is discharged through a top right discharge plate 23b into oven cavity 2 via apertures 100b and onto the right top and side portion of food product 10. As with the left side, apertures 100b may be slotted, regularly formed or irregularly formed apertures and are illustrated herein as nozzles 100b and 29b. Gas that has not been discharged through top right gas discharge plate 23b flows to lower right gas transfer section 18b via vertical transfer section 19b. Gas that is distributed to lower right gas transfer section 18b may be re-heated, if desired, by a lower right heating means 103b, shown in FIG. 4, before said gas passes through slotted or perforated lower right gas discharge plate 27b via apertures 29b, for discharge onto the right bottom and right side portions of food product 10 in oven cavity 2. Lower right heating means 103b may be present in some embodiments and not present in others depending upon the particular requirements for the speed cook oven. As with the left side, apertures 100b and 29b are sized for a low pressure drop, while providing and maintaining sufficient gas velocities in the range of approximately 2000 ft/minute (609.6 m/minute) to approximately 6000 ft/minute (1828.8 m/minute) but as discussed with the left side gas delivery system, velocities below 2000 ft/minute (609.6 m/minute) and above 6000 ft/minute (1828.8 m/minute) may be utilized if desired to properly cook the food product as described herein. As shown in FIG. 2, apertures 100b are sized such that the majority of the gas is supplied from the top right gas discharge plate 23b. The resulting imbalance of gas flows between the top right gas discharge plate 23b and lower right gas discharge plate 27b is desirable because the top flows must aggressively remove moisture produced and escaping from the top and top side surface of the food product 10. The imbalance also serves to heat, brown and/or heat and brown the food product 10.

The left and right gas supply systems, although independently described herein, are the same configuration, although not required to be the same, and function to uniformly circulate hot gas flow across the top and top sides and bottom and bottom sides of the food product, and return the gas to the heating mechanism for re-delivery to the cooking cavity.

As described, the gas flow is delivered via four gas transfer sections 17a, 17b, 18a, 18b which are located in the top and bottom corners of oven cavity 2 as shown in FIG. 4. Gas flow transfer sections 17a, 17b, 18a and 18b extend from the back wall 94 of oven cavity 2 to the front wall 95 of oven cavity 2, although it is not required that the gas flow transfer sections extend the entire depth (front to back) of the oven cavity. Gas transfer section 17a is located in the top left corner of oven cavity 2 where top wall 3 intersects oven cavity side wall 5; gas transfer section 17b in the top right corner where top wall 3 intersects right side wall 6; gas transfer section 18a in the lower left corner of the oven cavity where bottom wall 4 intersects left side wall 5; and gas transfer section 18b in the lower right corner where bottom wall 4 intersects right side wall 6. Each of the gas transfer sections are sized and configured to deliver the appropriate gas flow for the particular oven utilized. For example, in a smaller oven, the gas delivery sections, indeed the entire oven, may be sized smaller in proportion to the smaller footprint of the particular requirements, and a larger oven will have proportionally larger gas delivery sections. As seen in FIG. 2, the left side and the right side gas flows converge on the food product 10 thereby creating an aggressive flow field on the food product surface that strips away the moisture boundary layer. This turbulently mixed gas flow directed at the food product can best be described as glancing, conflicting and colliding gas flow patterns that spatially average the gas flow over the surface area of the food product producing high heat transfer and moisture removal at the food surface, thereby optimizing speed cooking. The gas flow is directed towards the top, the bottom and the sides of the food product from the left and right sides of the oven cavity and the left and right side gas flows conflict, collide and glance off each other at the food product surface before exiting the oven cavity through top gas egress opening. As used herein the term "mixing" refers to the glancing, conflicting and colliding gas flow patterns that meet at and upon the top surface, the bottom surface and the left and right side surfaces of the food product and produce high heat transfer and speed cooking of the food product due to spatial averaging of the gas flow heat transfer. As used herein, the terms "mix," "mixing," "turbulent mix," and "turbulent mixing."

The exemplary oven does not require smooth gas flow, laminar gas flow or air wrap gas flow. The mixing gas flows patterns are created within the oven cavity and, when appropriately directed and deflected, produce a high quality cooked food product very quickly. Enhancing the highly agitated, glancing, conflicting, and colliding gas flow of the present invention is the general upward flow path the gas will follow. This upward gas flow draws also the gas from lower gas discharge sections 18a and 18b thereby scrubbing the bottom of the food product, pot, pan or other cooking vessel, by pulling gas flow around the sides of said vessel, further enhancing the heat transfer, as well as drawing the gas that scrubs the upper surface up towards the oven cavity top wall.

Returning to FIG. 2, top gas discharge plates 23a and 23b are positioned within oven cavity 2 such that the gas flow from top left gas transfer section 17a conflicts and collides with the gas flow from top right gas transfer section 17b upon the food product surface and strikes the food product at an angle that is between zero degrees and 90 degrees as referenced from the horizontal top wall (where zero degrees is parallel to the horizontal top wall) and lower gas discharge plates 27a and 27b are positioned within oven cavity 2 such that the gas flow from lower gas transfer section 18a conflicts and collides with the gas flow from lower gas transfer section 18b upon the lower surface of the food product at an angle that is between zero degrees and ninety degrees as referenced from the horizontal bottom wall. Various cooking requirements may require that the angles of the gas discharge plates 23a, 23b, 27a and 27b be adjusted, either during manufacture, or adjustable within the unit after manufacture, in order for the chef or cook to change gas flow velocity angles (vectors) to effect different cooking profiles.

The number and placement of the apertures 100a, 100b, 29a and 29b will vary according to the particular oven that is required. As described herein, this invention is "scalable" and as used herein the term scalable has the meaning that the technology will provide for a platform of products, not merely one particular size or one particular product. If, for example, a speed cooking baking oven were desired (as opposed to a general purpose speed cooking oven which cooks proteins, baked products, etc.) the apertures may be larger, but fewer in number. This would allow for a more gentle gas flow field across the food product, and therefore more delicate baking of the food product. If a browning oven were desired, the apertures may be more numerous and smaller in diameter. Additionally, the operator may desire flexibility of cooking and in this circumstance, gas discharge plates 23a, 23b, 27a and 27b may be fabricated in a manner that allows for change-out of the plates. As used herein the term "aperture" refers to irregular slots, irregular holes or irregular nozzles, regularly formed slots, regularly formed holes or regularly formed nozzles or a mixture of regularly formed and irregularly formed slots, holes or nozzles. FIG. 2 illustrates the use of three rows of apertures 100a and 100b on the top side gas flow systems, gas delivery sections 17a and 17b, and two rows of apertures on the lower side gas flow systems 18a and 18b although more rows and numbers of apertures or fewer rows and numbers of apertures may be utilized for sections 17a, 17b, 18a and 18b.

The gas delivery system as illustrated in FIG. 2 produces aggressive glancing, conflicting and conflicting gas flow patterns 30a and 30b wherein a gas flow is directed onto the top surface of the food product. An aggressive top glancing, conflicting and colliding gas flow pattern 30a also interacts with the left top portion and left top side portion of food product 10 and a similar right top glancing, conflicting and colliding gas flow pattern 30b interacts with the right top portion and top right side portion of food product 10. Gas flow is also directed to the lower gas transfer sections 18a and 18b. As such, an aggressive glancing, conflicting and colliding gas flow patterns 31a and 31b interact with the lower left and right portions of the food product. This cooking profile creates high heat transfer capability by using the irregular surface of the food product, as well as the interference of flow fields to minimize boundary layer growth. The angle of the gas flow velocity vector leaving the top left and top right discharge plates 23a and 23b respectively, and the bottom left and bottom right discharge plates 27a and 27b respectively, is between zero degrees and 90 degrees from horizontal bottom wall 4. After the aggressive glancing and conflicting gas flow patterns 30a and 30b contact or strike the food product they are exhausted through top egress section 12 and cycle back through the oven as described herein.

The re-circulating oven may also utilize microwave energy to at least partially cook the food product. As seen in FIG. 4, left side microwave launching waveguide 20a is attached within oven cavity 2 between top left gas transfer section 17a and lower left gas transfer section 18a. Right side microwave launching waveguide 20b is attached within oven cavity 2 between top right gas transfer section 17b and lower right gas transfer section 18b. The microwave waveguides are designed to distribute microwave power uniformly from the back to the front of oven cook cavity 2. Such a configuration promotes uniform illumination of microwave energy to the right side and the left side of the cook chamber because the microwave energy from the side walls is additive over the product. The vertical distance above cavity bottom wall 4 of waveguides 20a and 20b is such that, under normal cooking conditions, approximately more than one third of the microwave energy is available below cooking rack 8a, with the balance of microwave energy available above cooking rack 8a.

Figure 5:
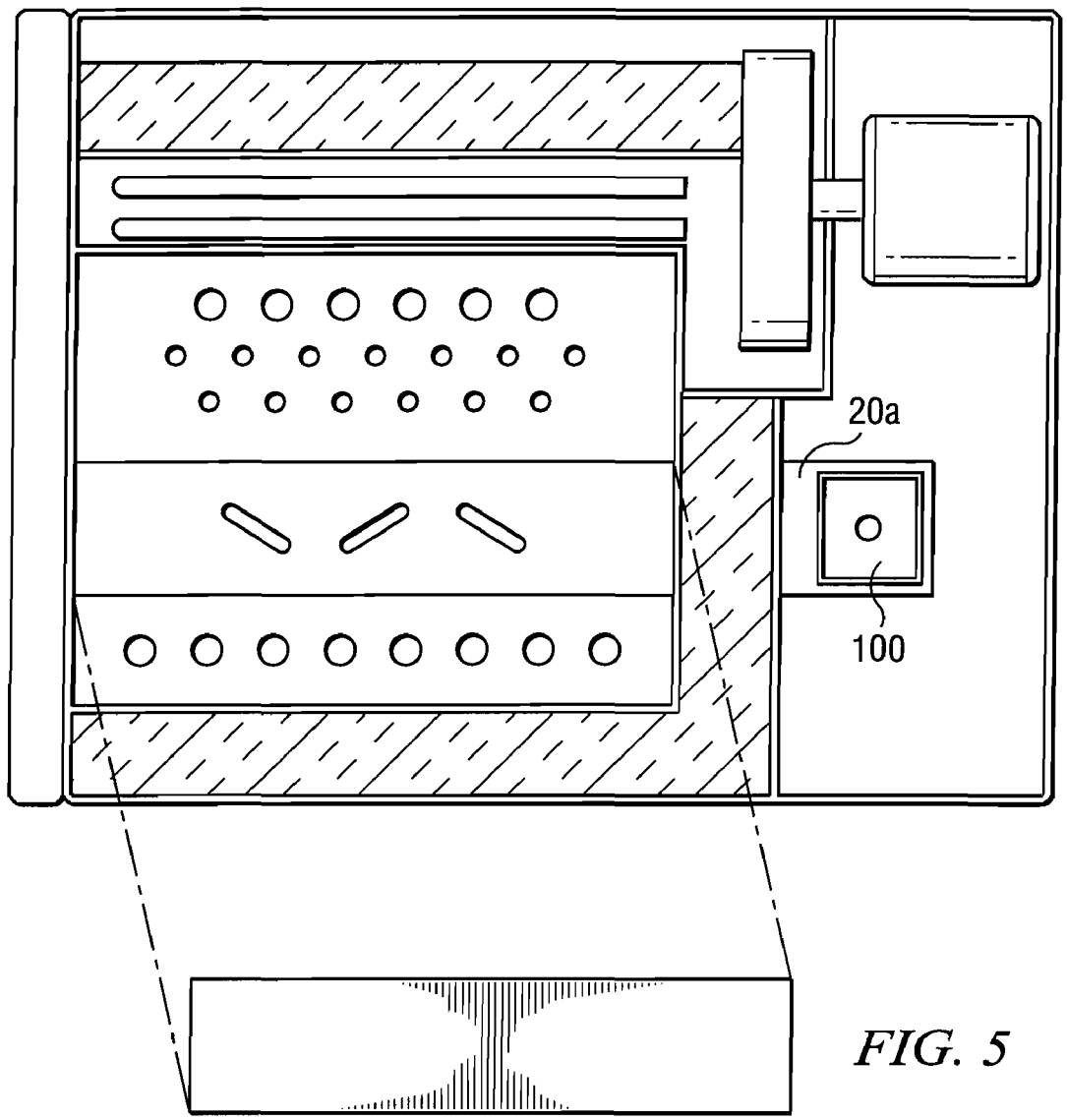
FIG. 5 is a side view of a single cavity speed cooking re-circulating oven illustrating left side wall slotted waveguide and magnetron.

Waveguides 20a and 20b are located on the left and right side walls of the oven, and therefore do not interfere with oven cavity spent gas exhaust. The microwave waveguides are located on the side walls of the oven cavity, and are not affected by food spills, grease contamination, cleaning fluid contamination or other contamination that normally affect a bottom launch microwave system. The microwave system of the present invention will therefore be less likely to be penetrated by grease, spills, cleaning materials and other contaminants because the systems are not located directly under the food product where hot contaminants will drip. Microwave producing tubes, or magnetrons 100, FIG. 5 are positioned in waveguides 20a and 20b although two magnetrons are not required and less than two, or more than two, may be utilized. Indeed, for multiple rack ovens more than two magnetrons may be desirable.

Figure 1:
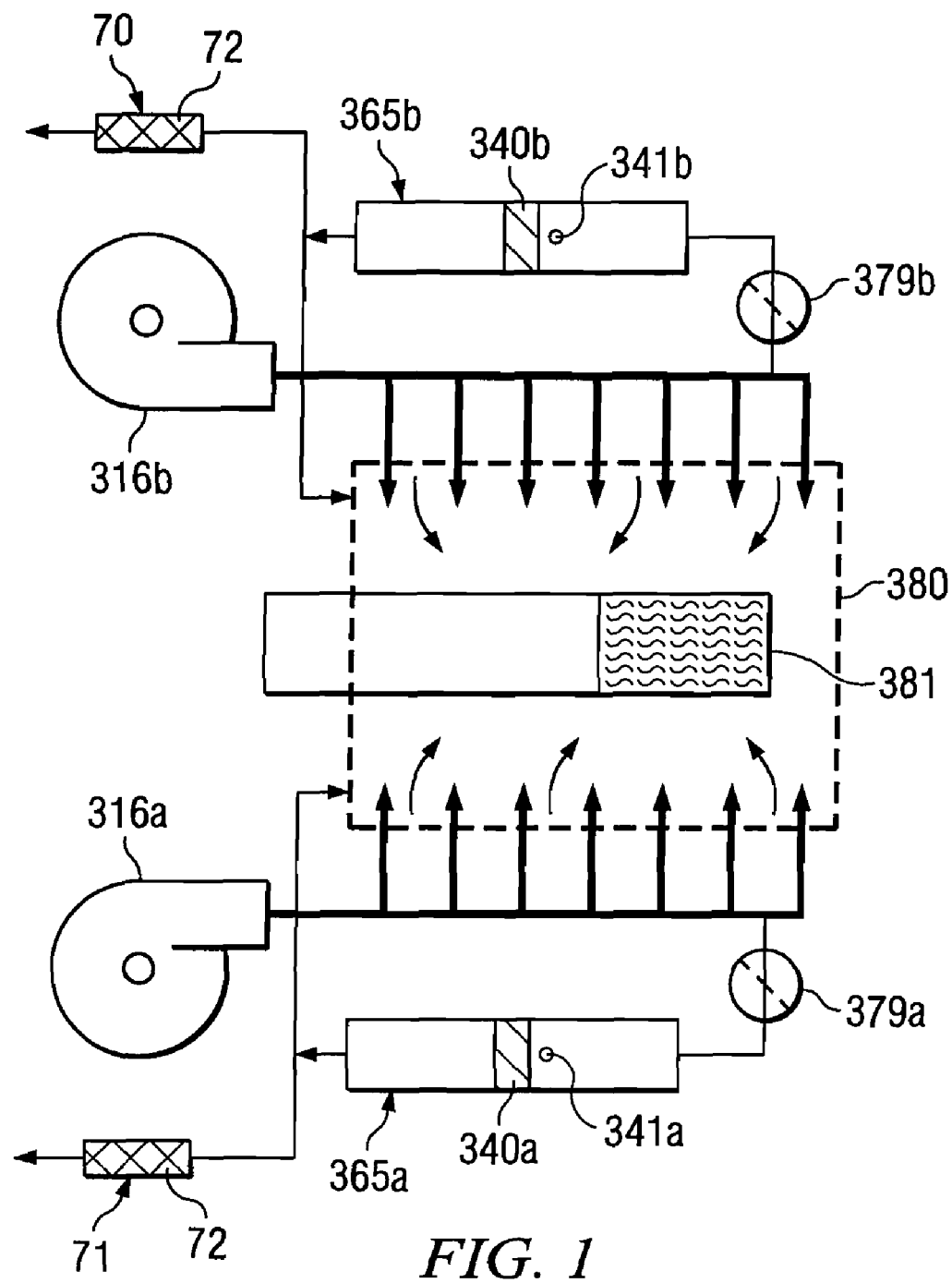
FIG. 1 illustrates the bleed gas clean-up system of the present invention.
Figure 2:
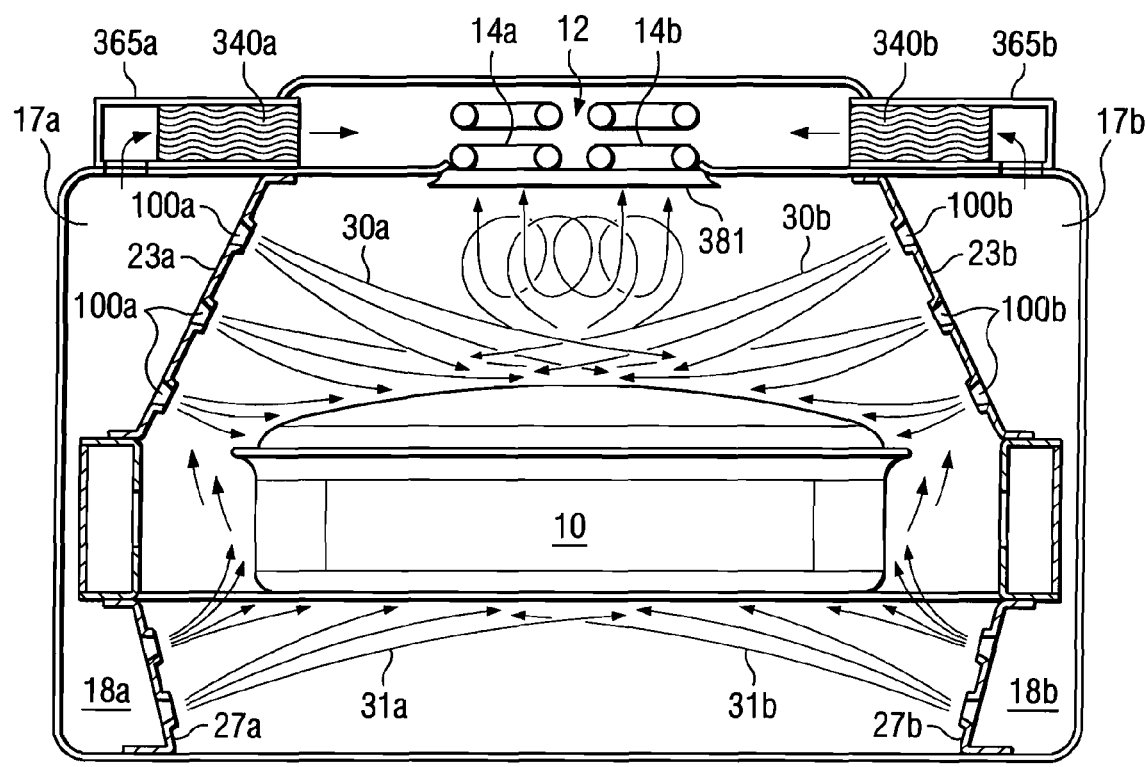
FIG. 2 is a front view of a single cavity speed cooking re-circulating oven.

FIG. 1 illustrates the use of our gas bleed catalyst system. Although exemplary embodiment appliance 1 has been described as a re-circulating speed cooking appliance, the simplest embodiment of a re-circulating oven consists of an oven cook chamber separated from the gas moving means (e.g., blower wheel) by a baffle or separation plate that isolates the gas inlet of the gas moving device from the exhaust flow of the gas moving device, 380, FIG. 1. The oven gas flow returning (return gas) to the gas moving device inlet is at a lower pressure state as compared to the exhaust of the gas moving device which is supplied (supply gas) to the oven cook chamber. Heating the gas which flows from the cavity through the gas moving device and is supplied to the cavity may be accomplished by a heat source located in the cook chamber, flow conduit, volume associated (plenum) with the gas moving device, or any combination of these locations. Additionally, the heat source may be located remotely form the oven with the re-circulating oven gas passing through the heating device.

Re-circulating oven 380, FIG. 1, may be comprised of two levels of cooking by-product control. The first level is roof mounted grease particle extractor 381, FIG. 1, previously described in use with appliance 1. The second level of cooking by-product clean-up is left and right bleed gas cleanup systems 365a, 365b, FIG. 1 which cleans or scrubs cooking by-products within the gasflow stream. These levels of gasflow clean-up may be used either independently or combined and FIG. 1 illustrates the combined use of both stages. The first stage is a mechanical separator means, FIG. 1, 381, that collects grease/liquid particle up stream of the second stage bleed gas clean-up systems. Mechanical grease filter 381 reduces the quantity of grease associated with the larger non-aerodynamic particles prior to entry into the return ducts. This element is located at the roof line of the cavity, 381, FIG. 4, where the upward flowing gas exits oven cavity 2. Due to the upward flow characteristics of the gas leaving the oven, larger grease particles are less likely to be entrained. As such, the mechanical separator design can be simplified and a simple metal grill or mesh can provide sufficient grease separation to minimize grease particles from adhering to the surfaces of gasflow ducts. A more conventional baffle filter (convoluted flow path) may also be used. The grease filter also acts as a microwave filter, in those instances wherein microwaves are utilized in the re-cycling oven, preventing substantial amounts of microwave radiation from leaving the cook cavity and being absorbed in the airflow ducts (loss of useful energy). In addition, minimizing microwave "leakage" into the ducts (when microwaves are utilized) reduces the construction complexity associated with fabrication of sheet metal parts that are "microwave tight" and it eliminates microwave energy contamination of temperature sensors (output signal from sensor) that may be located in the passage ways.

The second stage bleed gas clean-up system is positioned after mechanical separator 381 and handles cooking by-products such as grease vapor and small grease/smoke particles. Our bleed gas clean-up system invention continuously cleans only a small portion of the gas that exits the oven cavity. First, grease laden gasflow exits the oven cavity via an opening in the oven cavity, preferable through the oven roof. Such gasflow is referred to herein as "return gas." The return gas is pressurized via convection gas blower(s) and the pressurized gas leaving the blower is directed into the oven. A small portion of the pressured gas "bleed gas" leaving the blower discharge is diverted to the inlet of the bleed gas clean-up chamber. The bleed gas passes through an odor filter, shown as catalytic converters within the bleed gas clean-up system where a substantial amount of the cooking by-products are oxidized. Cleaner gas leaving the bleed gas clean-up system is either reintroduced into the gas stream or is vented from the oven. In the exemplary embodiment, a portion of gas flow leaving the oven chamber is diverted to the inlet side of gas bleed chamber 365a, 365b, FIG. 1, with odor filters 340a, 340b located within the bleed gas chambers. The portion of gas flow diverted to said bleed chamber is referred to herein as the "bleed gas flow" and odor filters 340a, 340b remove the desired amount of cooking by-products during a single pass. In some embodiments it may be desirable for the odor filters to remove all, or as much cooking by-product as possible and varying destruction efficiencies of odor filters 340a, 340b will produce varying results and in those instances wherein odor filters 340a, 340b are of the catalytic type, destruction efficiencies of greater than 50% have shown to produce acceptable results. The bleed gas clean-up system is configured as an internal cleaning gas loop operating separate from the main gas flow to oven 380. In those instances wherein odor filters 340a, 340b are a high efficiency catalytic type filter for high cooking by-product destruction efficiencies, a large pressure drop may occur across odor filter 340a, 340b. Space velocities for the catalytic converter range are typically in the range between approximately 60,000/hr to 120,000/hr, depending on the catalyst material utilized, the amount of cooking by-product loading in the gas stream and odor filters 340a, 340b inlet ambient temperature. Unlike the placement of an odor filter in the main gas flow which results in a significant pressure drop on the entire re-circulating gas flow, the use of catalytic filters, or other odor filters within the bleed gas clean-up system does not significantly reduce gas flow system pressure to oven 380. The small bleed gas flow utilizes nearly the entire pressure capability of the gas flow means through the gas bleed system, thereby permitting the use of catalytic materials required for a high destruction efficiency, based on one pass through odor filters 340a, 340b. Additionally, the small bleed gas odor filters 340a, 340b are easily installed, can be placed in convenient locations and readily accessible. Bleed gas flows are a fraction of the main gas flow to the oven, therefore significant inlet gas temperature preheat may be achieved. Placing small gas pre-heaters 341a, 341b, FIG. 1 prior to odor filters 340a, 340b within the bleed gas clean-up system may additionally provide substantial improvement in the destruction efficiency of odor filters 340a, 340b. Pre-heaters 341a, 341b are capable of increasing the gas inlet temperature by greater than 100° F. (37.78° C.) and this temperature increase in the bleed gas prior to odor filter 340a, 340b makes it possible to achieve the desired destruction efficiency with less catalyst material. Pre-heaters 341a, 341b are capable of producing cooking by-product control with oven chamber temperatures below 350° F. (176.67° C.), therefore additional appliance flexibility is achieved by simultaneously permitting lower oven cook temperature setting while providing cooking by-product control.

The bleed gas is not drawn from the cavity, but rather it is configured as a internal cleaning gas loop operating off the main convection air stream and the bleed gas flows are a fraction of the main convection flow of the oven. The bleed gas flow is approximately 10% of the total gas flow, blowers 316a, 316b, and pre-heaters 341a, 341b each provide approximately 600 watts of heat for a 100° F. (37.78° C.) rise in gas inlet temperature. The combined 1200 watts of heating is less than one third of the total heat required for the oven and is very close to the heat needed to satisfy standby losses of the oven (i.e., heat loss due to conduction, radiation, vent losses to ambient). As such, the pre-heaters may be utilized during idle operation instead of larger (for this example 2000 W) main gas heater used to satisfy cooking needs. Additional appliance flexibility can therefore be achieved by simultaneously permitting lower oven cook temperature setting while providing grease control.

By using an effective cooking by-product clean-up system that oxidizes the majority of cooking by-products during a single pass of the gas through the bleed gas clean-up system, the small bleed gas flow continually removes cooking by-products and this invention provides excellent grease and odor control in those instances wherein the destruction efficiency of the catalytic converter is greater than 50%. Unlike a catalytic converter in the main gasflow system which does a small amount of grease oxidation on each pass of the total convection airflow, the present invention uses only a fraction of this gas at any given time to control cooking by-products. In addition, a vent function comes without additional hardware, in that, a portion of the cleaner bleed air can be discharged to ambient Controller 34, FIG. 4 may be utilized in conjunction with damper means 379a, 379b, FIG. 1 to control the amount of bleed gas flow into each bleed gas clean-up system 365a, 365b and thereafter through each odor filter 340a, 340b. For example, oven 380 may contain a food product that, upon conventional, accelerated or speed cooking, will produce varying amounts of cooking by-products. In such an instance, controller 34 may allow for more gas flow to pass through odor filter 340a or 340b or both 340a and 340b of oven 380

To summarize, the present invention provides for clean-up of cooking by-products within a gas flow for conventional, accelerated and speed cooking re-circulating ovens utilizing hot gas flow, and hot gas flow coupled with microwave energy in order to achieve conventional, accelerated and speed cooking of food products.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

Other modifications and improvements thereon will become readily apparent. Accordingly, the spirit and scope of the present invention is to be considered broadly and limited only by the appended claims, and not by the foregoing specification. Any element in a claim that does not explicitly state "means for" performing a specific function, or "step for" performing a specific function, is not to be interpreted as a "means" or "step" clause as specified in 35 U.S.C. §112, ¶6. In particular, the use of "step of" in the claims herein is not intended to invoke the provisions of 35 U.S.C. §112.

The invention claimed is:

1. A re-circulating oven for cooking a food product, comprising:
   a housing defining an oven cavity;
   a conduit means for circulating a main convection air stream of gas to and from the oven cavity;
   a flow means, comprising a blower, for causing circulation of the gas;
   a thermal means for heating the gas;
   a first gas directing means disposed above the food product; the first gas directing means being operably associated with the conduit means; and
   a second gas directing means disposed above the food product, the second gas directing means also being operably associated with the conduit means;
   wherein the first and second gas directing means are configured to cause the gas from the first gas directing means to collide with the gas from the second gas directing means upon the upper surface of the food product; and
   a bleed gas clean-up system comprising an internal cleaning gas loop operating off the main convection air stream arranged such that a portion but less than all of the main convection air stream in the conduit means is separated from the main convection stream and is diverted into the internal cleaning gas loop and cleaned during a single pass of the main convection air stream through the conduit means and oven cavity, and such that at least a portion of the cleaned diverted air is returned from the internal cleaning gas loop to the main convection air stream circulating in the conduit means.

2. An oven for cooking a food product, comprising:
   a housing defining an oven cavity;
   a conduit means for circulating a main convection air stream of gas to and from the oven cavity;
   a flow means, comprising a blower, for causing circulation of the gas;
   a thermal means for heating the gas;
   a first gas directing means disposed below the food product; the first gas directing means being operably associated with the conduit means; and
   a second gas directing means disposed below the food product, the second gas directing means also being operably associated with the conduit means;
   wherein the first and second gas directing means are configured to cause the gas from the first gas directing means to collide with the gas from the second gas directing means upon the lower surface of the food product; and
   a bleed gas clean-up system comprising an internal cleaning gas loop operating off the main convection air stream arranged such that a portion but less than all of the main convection air stream in the conduit means is separated from the main convection stream and is diverted into the internal cleaning gas loop and cleaned during a single pass of the main convection air stream through the conduit means and oven cavity, and such that at least a portion of the cleaned diverted air is returned from the internal cleaning gas loop to the main convection air stream circulating in the conduit means.

3. The oven of claim 1, further comprising:
   a first lower gas directing means disposed below the food product, the first lower gas directing means being operably associated with the conduit means; and
   a second lower gas directing means disposed below the food product, the second lower gas directing means also being operably associated with the conduit means;
   wherein the first and second lower gas directing means are configured to cause the gas from the first lower gas directing means to collide with the gas from the second lower gas directing means upon the bottom surface of the food product.

4. The oven of claim 1, further comprising:
   a control means for controlling the gas flow to the bleed gas clean-up system.

5. The oven of claim 1, wherein the gas exits the oven cavity via the top wall of the oven cavity.

6. The oven of claim 1, in which the internal cleaning gas loop comprises at least one filter.

7. The oven of claim 1, further comprising:
   a damper means for adjusting the amount of bleed gas delivered to the bleed gas clean-up system.

8. The oven of claim 1, further comprising:
   an electromagnetic source.

9. The oven of claim 8, wherein the control means controls the electromagnetic source, the damper means, the flow means, the thermal means, or combinations thereof.

10. The oven of claim 8, wherein the control means is comprised of toggle switches to control the electromagnetic source, the damper means, the flow means, the thermal means, or combinations thereof.

11. The oven of claim 8, wherein the control means is comprised of rotary switches to control the electromagnetic source, the damper means, the flow means, the thermal means, or combinations thereof.

12. The oven of claim 8, further comprising:
    a control panel for controlling the operation of the electromagnetic source, the damper means, the flow means, the thermal means, or combinations thereof.

13. The oven of claim 1, wherein the bleed gas clean-up system further comprises:
    a gas bleed chamber.

14. The oven of claim 13, further comprising a filter in the gas bleed chamber.

15. The oven of claim 14, wherein the filter causes catalytic destruction of cooking by-products.

16. The oven of claim 15, further comprising a pre-heater to heat the bleed gas flow prior to the gas entering the catalytic filter.

17. The oven of claim 14, further comprising a vent to atmosphere, and wherein the gas bleed chamber has an outlet communicating with the vent.

18. The oven of claim 14, wherein gas leaving the gas bleed chamber is either returned into the main convection air stream or vented from the oven.

19. The oven of claim 1, wherein the oven is an accelerated cooking oven.

20. The oven of claim 1, wherein said portion of the main convection air stream diverted into the internal cleaning gas loop is approximately 10% of the total gas flow.

21. The oven of claim 1, wherein said first gas directing means and second gas directing means direct gas from opposite sides of the oven cavity.

* * * * *